Sept. 15, 1970                    C. W. TRACY                    3,528,466
SCREW FASTENER AND APPARATUS FOR APPLYING
Filed Feb. 2, 1968                                          2 Sheets-Sheet 1
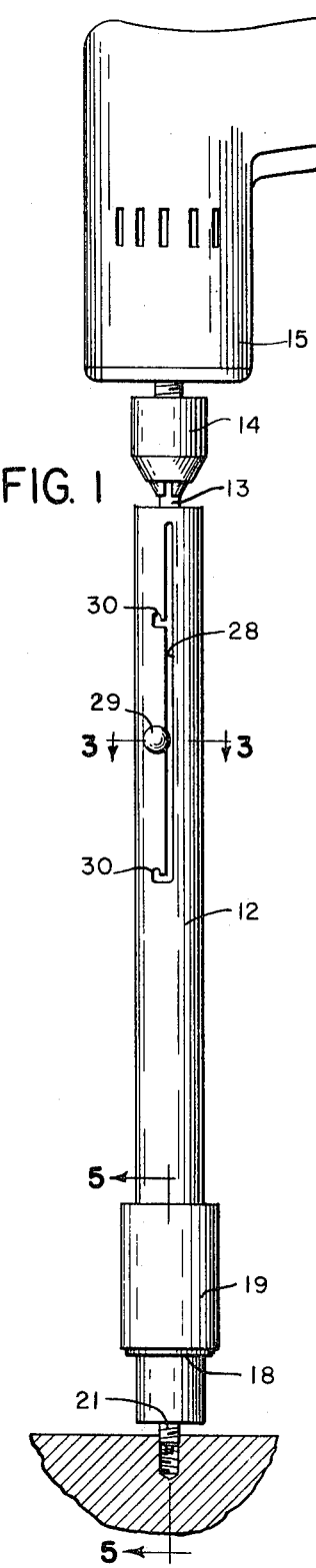
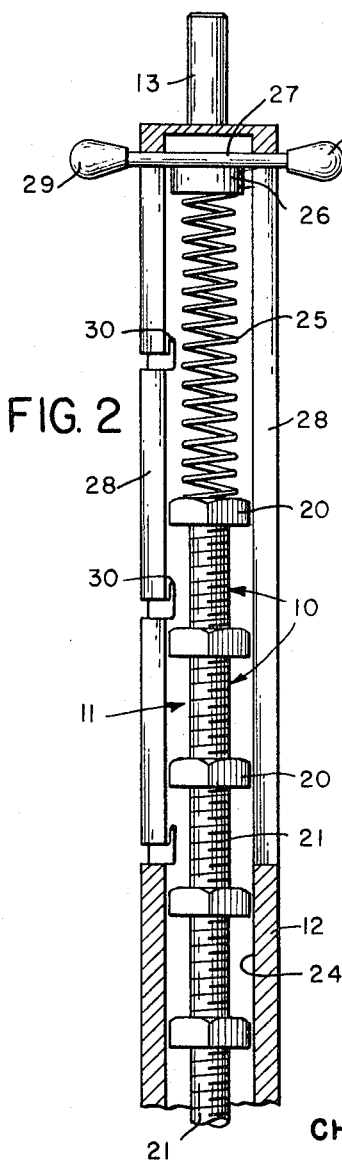
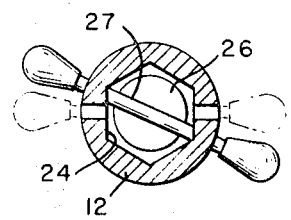
INVENTOR
CHARLES W. TRACY
ATTORNEYS Sept. 15, 1970     C. W. TRACY     3,528,466
SCREW FASTENER AND APPARATUS FOR APPLYING
Filed Feb. 2, 1968     2 Sheets-Sheet 2
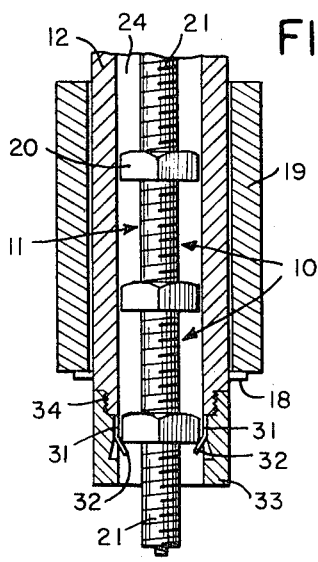
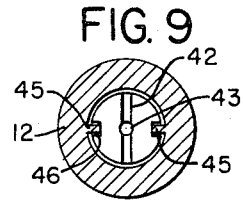
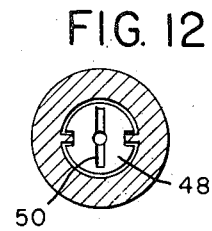
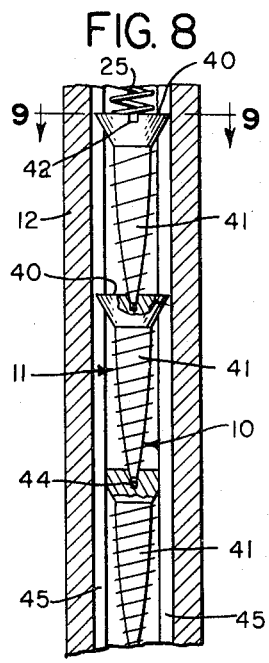
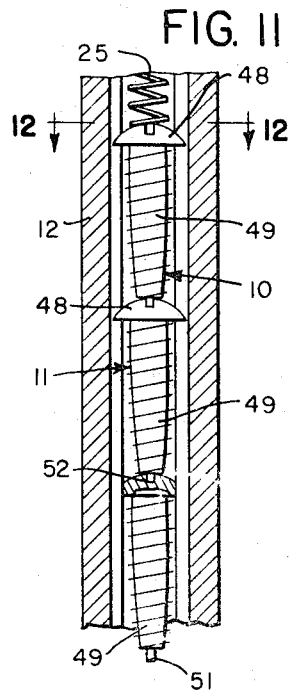
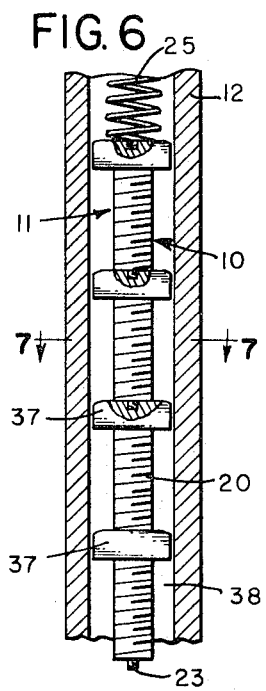
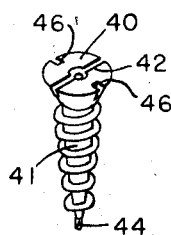
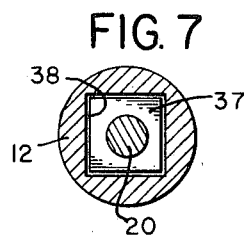
INVENTOR
CHARLES W. TRACY
BY *[signature]*
ATTORNEYS

United States Patent Office 3,528,466
Patented Sept. 15, 1970

3,528,466
SCREW FASTENER AND APPARATUS FOR APPLYING
Charles W. Tracy, Tallahassee, Fla., assignor to International Enterprises, Inc., Tallahassee, Fla.
Filed Feb. 2, 1968, Ser. No. 702,639
Int. Cl. B25b 23/06
U.S. Cl. 144—32       7 Claims

ABSTRACT OF THE DISCLOSURE

A plurality of independent screw fasteners connected together in a screw stick and apparatus for holding a stick of screws and for driving said screws one at a time.

BACKGROUND OF THE INVENTION

Field of the invention

This invention relates generally to screw fasteners of various kinds, and particularly to screw fasteners which are formed independently and are connected together in end-to-end relation to form a screw stick. Also the invention relates to an apparatus for holding and driving the screws one at a time and dispensing the screws from the apparatus.

Description of the prior art

Many efforts have been made to provide a stick of screws, as well as apparatus for applying the screws one at a time. However, the stick of screws of the prior art normally has been made of a continuous bar of metal which is fed into an automatic screw machine that forms threads on the individual screws without separating one screw from the next but instead leaves the screws attached to each other by a reduced neck portion or portion which is weaker than the remaining portions of the stick so that when one screw is applied the next succeeding screw will be separated by being twisted off at the reduced weakened portion. The apparatus for applying the screws normally has been a heavy, cumbersome, expensive device which required a skilled operator and through which the stick of screws was fed into one end and dispensed from the opposite end. Since the screws were fed entirely through the implement, complicated means were provided for causing the screws to be advanced and for applying at least a light pressure on such screws. Also the prior art devices, due to their construction, have been limited to straight shanked machine screws. Screws having a tapered shank, such as wood screws or self-tapping sheet metal screws, have been unavailable for this type of work.

SUMMARY OF THE INVENTION

The present invention relates to screw fasteners of the tapered shank wood screw type, as well as the straight shank machine screw type which are formed independently and are connected together in a screw stick and will automatically separate the screw being driven from the remainder of the stick. Also the invention relates to apparatus including a magazine for holding and dispensing a stick of screws one at a time. The magazine is provided with an adjustable spring means to maintain a substantially constant tension on the screws within the same.

It is an object of the invention to provide a plurality of independent screw fasteners having means for connecting the screws together in end-to-end relation in such a manner that the screw being driven automatically will be separated from the stick of screws.

Another object of the invention is to provide apparatus for holding a stick of screws in a position for driving and for maintaining the stick of screws under a spring tension regardless of the number of screws within the magazine.

BRIEF DESCRIPTION OF THE DRAWINGS

FIG. 1 is a side elevation illustrating one application of the invention.

FIG. 2 is an enlarged fragmentary vertical section of the device of FIG. 1.

FIG. 3 is an enlarged section on the line 3—3 of FIG. 1.

FIG. 4 is an enlarged exploded side elevation of a stick of screws.

FIG. 5 is an enlarged section on the line 5—5 of FIG. 1.

FIG. 6 is a fragmentary vertical section of a modified form of magazine and screw stick.

FIG. 7 is a section on the line 7—7 of FIG. 6.

FIG. 8 is a view similar to FIG. 6 of a further modified form of the invention.

FIG. 9 is a section on the line 9—9 of FIG. 8.

FIG. 10 is a perspective of one of the wood screws illustrated in FIG. 8.

FIG. 11 is a vertical section similar to FIG. 6 of a further modified form of the invention.

FIG. 12 is a section on the line 12—12 of FIG. 11, and

FIG. 13 is an enlarged fragmentary section illustrating a modified form of screw connection means.

DESCRIPTION OF THE PREFERRED EMBODIMENTS

With continued reference to the drawings, a plurality of individual screws 10 are connected in end-to-end relation to form a stick of screws 11, as will be described later, and such stick normally is carried within a magazine 12. Such magazine may be constructed of metal, plastic, or other rigid material and normally has a generally cylindrical outer configuration. The upper end of the magazine 12 is provided with a cylindrical projection 13 which is adapted to be clamped in the chuck 14 of a rotary driving implement, such as a drill 15. If desired the drill 15 may have a gear reduction and an overriding clutch which is conventional in this type of implement.

The magazine 12 is provided with an outwardly extending flange 18 adjacent the end remote from the projection 13 and such flange is adapted to support a collar or sleeve 19 disposed about the magazine 12. The sleeve 19 is held by the operator of the device in a position where the operator will have control of the free end of the magazine when the screw is being inserted. The sleeve is freely rotatably mounted on the magazine so that the magazine can be rotated by the drill 15 while the sleeve is being held in fixed position by the operator.

With reference to FIGS. 2–5, the screws 10 are formed with hexagonal heads 20 and generally straight shanks 21 with external righthand threads thereon. In order to connect the screws in end-to-end relation each of the hexagonal heads 20 is provided with a recess 22 having internal lefthand threads and each of the shanks 21 is provided with a reduced extension 23 having at least one complete lefthand thread which cooperates with the threads of the recess 22. It is noted that the extension 23 and the recess 22 can be of any desired length, although a length sufficient to provide one or two complete threads has been found satisfactory.

After the screws are assembled they are placed within the internal cavity 24 of the magazine which is substantially the same configuration in cross-section as the hexagonal heads 20 and slightly larger to permit free sliding movement of the screws but which will engage the hexagonal heads of the screws when the magazine is rotated. In order to apply a tension to the stick of screws 11, a coil spring 25 is provided in the uppermost portion of the cavity 24 and such spring is adapted to urge the screws toward the opposite end of the magazine.

The tension of the spring 25 is adapted to be maintained substantially constant so that equal pressure will be applied to the screws as they are discharged from the magazine. This is done by providing a backing plate 26 at the uppermost end of the spring 25 and such backing plate is secured to a cross pin 27 which extends through slots 28 in opposite sides of the magazine 12. If desired the cross pin 27 may have enlargements 29 for ease in handling or such enlargements may be omitted and the cross pin 27 may extend slightly beyond the magazine 12 to reduce the possibility of engagement with some exterior object while the magazine is being rotated.

In order to lock the backing plate 26 in various positions along the length of the magazine, a plurality of opposed bayonet slots 30 are in communication with the slots 28 and such bayonet slots are adapted to receive the cross pin 27 and lock the same in position. After some of the screws have been discharged, the tension of the spring 25 will lessen and by moving the cross pin 27 and the backing plate 26 downwardly and locking the cross pin in a pair of opposed bayonet slots 30, the tension on the coil spring 25 will be increased substantially to the initial tension.

At the opposite end of the magazine, means is provided for holding the stick of screws against the tension of the spring 25 and this means may include a pair of opposed spring fingers 31 having portions 32 which extend outwardly into the path of travel of the hexagonal heads 20. The spring fingers 31 are sufficiently strong to hold the screws against the tension of the spring 25 but will give after the screw has been inserted and the magazine is pulled rearwardly. The spring fingers 31 are mounted within a nozzle 33 which is connected to the end of the magazine 12 by screw threads 34 or other connecting means which will permit the nozzle to be removed so that a stick of screws can be inserted within the magazine. It is noted that any convenient releasable holding means such as spring loaded detents can be used to replace the spring fingers 31.

With reference to FIGS. 6 and 7 the screws 10 are provided with square heads 37 which are received within a square cavity 38 within the magazine 12. In this modification the screws have generally straight shanks 21 with righthand threads and the reduced extension 23 has lefthand threads receivable within lefthand threaded recesses 22 of the heads 37 in a manner similar to that previously described.

With reference to FIGS. 8–10 the screws 10 are of the wood screw type having a flat head 40 and a tapered shank 41 with righthand threads thereon. The flat head 40 of each screw is provided with a screw driver slot 42 for removing the screw after it has been driven. Each of the flat heads 20 is provided with a central recess 43 having internal lefthand threads and the end of the shank 41 is provided with a reduced extension 44 having lefthand threads which cooperatively engage the lefthand threads of the recess 43. In order to slidably engage the flat heads 40 the magazine 12 is provided with a pair of opposed inwardly extending keys 45 and the heads 40 of the screws are provided with opposed keyways 46 disposed substantially at right angles to the screw driver slot 42 and adapted to slidably engage the keys 45.

With reference to FIGS. 11 and 12 the screw 10 is of the round head self-tapping type which includes a round head 48 and a slightly tapered shank 49 with righthand threads thereon. The round head 48 is provided with a screw driver slot 50 for removing the screws after they have been driven. The magazine 12 is provided with keys 45 and the round heads 48 of the screws are provided with keyways 46 similar to the construction of FIGS. 8–10. In this modification the shank 49 may have a threaded projection at the end as previously described or may be provided with an unthreaded projection 51 and the head 48 may have an unthreaded recess 52 of a size slightly larger than the projection 51. In the assembly of this modification an adhesive 53 is placed within each of the recesses 52 and thereafter the projections 51 are inserted and the adhesive is permitted to harden.

In the operation of the device a plurality of individual screws are formed with screw threads along the shank which normally are righthand threads and a projection is formed on the end of the shank. A recess is formed centrally of the top surface of the screw head and such recess is adapted to receive the projection of the next succeeding screw shank. After the screws have been assembled into a stick of screws, they are inserted within the magazine 12. The nozzle 33 then is applied to the end of the magazine and the magazine is ready for use.

When it is desired to use the magazine, the projection 13 is clamped within the chuck 14 of a drill 15 and the shank of the outermost screw which extends beyond the magazine is aligned with an opening in the work. The drill 15 then is operated to rotate the magazine 12 while the operator is holding the sleeve 19 and guiding the magazine. Rotation of the mgaazine will rotate the stick of screws within the same and the lowermost screw will enter the opening in the work and be threadedly connected thereto. When the lowermost screw has been seated or fully driven, the magazine is retracted slightly until the head of the driven screw is removed from the magazine and thereafter continued rotation of the magazine will unscrew the lefthand threads of the projection of the next succeeding screw from the recess of the driven screw and separate the driven screw from the remaining stick.

After all of the screws have been dispensed from the magazine, the magazine is saved and can be refilled and reused.

It is noted that whereas the invention has been described and illustrated as having threads in one direction and the projections at the end of the shank having threads in the opposite direction, it is contemplated that the direction of the threads could be reversed.

It will be obvious to one skilled in the art that various changes may be made in the described embodiments of the invention without departing from the spirit and scope thereof and therefore the invention is not limited by that which is illustrated in the drawings and described in the specification, but only as indicated in the accompanying claims.

What is claimed is:

1. Apparatus for accommodating a plurality of screws connected together in end-to-end relation and for driving said screws one at a time comprising an elongated magazine having a cavity with a cross-sectional configuration corresponding to the configuration of screw heads, implement attaching means on one end of said magazine for causing rotation of said magazine when said implement is operated, spring means within said cavity adapted to urge said screws outwardly from the end of said magazine remote from said implement attaching means, means for adjusting the tension on said spring means, means located within said cavity adjacnt to said remote end for retaining said screws within said magazine, whereby said magazine can be connected to a rotary implement to dispense said screws one at a time from said magazine.

2. The structure of claim 1 including sleeve means freely rotatably mounted on said magazine adjacent to said remote end for controlling and guiding said magazine.

3. The structure of claim 1 in which said internal cavity is provided with at least one key on which said screws are slidably and non-rotatably mounted.

4. The combination of a plurality of independent screws and a magazine for maintaining said screws in end-to-end relation and for driving and dispensing said screws one at a time comprising an elongated generally cylindrical body, means for connecting said body to a rotatable implement to rotate said body, said body having in internal cavity of a cross-sectional configuration corresponding generally to the configuration of the head portions of said screws, means for urging said screws outwardly from one end of said body, means for adjusting the tension on said screw-urging means, means for retaining said screws within said internal cavity until driven, each of said screws having a head portion of a predetermined configuration and a shank portion having external threads in a predetermined direction, whereby said screws are inserted within said body in end-to-end relation and dispensed one at a time when said body is rotated.

5. The structure of claim 4, including a reduced extension on the shank portion of each of said screws and an axial recess in the top surface of each of said screw head portions, said recess being of a size to accommodate the reduced extension of an adjacent screw.

6. The structure of claim 5 in which said reduced extension and said recess are provided with threads in a direction opposite the threads of the shank portion.

7. The structure of claim 4 in which said screw-urging means includes adjustable spring means within said cavity.

References Cited

UNITED STATES PATENTS

| | | | |
|---|---|---|---|
| 2,073,328 | 3/1937 | Wasserlein | 206—56 |
| 2,256,012 | 9/1941 | Blair | 144—32 |
| 2,302,621 | 11/1942 | Luboshez | 85—41 |
| 2,322,024 | 6/1943 | Hutchison | 144—32 |
| 3,263,806 | 8/1966 | Ring | 206—56 |

GERALD A. DOST, Primary Examiner

U.S. Cl. X.R.

85—41; 206—56